United States Patent [19]
Brenes

[11] Patent Number: 5,884,899
[45] Date of Patent: Mar. 23, 1999

[54] HALF PROFILE GATE VALVE

[76] Inventor: Arthur Brenes, 5855 Jensen Rd., Castro Valley, Calif. 94546

[21] Appl. No.: 892,506

[22] Filed: Jul. 14, 1997

[51] Int. Cl.⁶ .................................................. F16K 31/00
[52] U.S. Cl. .......................... 251/335.3; 251/62; 251/204
[58] Field of Search .............................. 251/335.1, 335.3, 251/62, 203, 204

[56]           References Cited

U.S. PATENT DOCUMENTS

| | | | |
|---|---|---|---|
| 3,038,692 | 6/1962 | Holmes | 251/204 |
| 3,086,745 | 4/1963 | Natho | 251/62 |
| 4,431,159 | 2/1984 | Stubbs | 251/335.3 |
| 5,626,324 | 5/1997 | Nakamura et al. | 251/204 |

OTHER PUBLICATIONS

Brochure for "High Vacuum Apparatus: New Design Million Cycle Valves," High Vacuum Apparatus Manufacturing, Incorporated, Hayward: California.

*Primary Examiner*—A. Michael Chambers
*Attorney, Agent, or Firm*—Flehr Hohbach Test Albritton & Herbert

[57]                ABSTRACT

A gate valve (110) includes a valve housing (112), valve plate (130), and linkage assembly (134, 136, 140). An actuator assembly (124) includes a cylinder component (150) and a piston component (170). Piston component (170) includes a piston rod (174) that has a downwardly extending annular collar (187) and cylinder component (150) includes an end wall (156) with an upstanding annular collar (160), which slidingly mates with collar (187). A bellows shield (192) is flexibly mounted between the piston rod and the cylinder end wall to isolate the valve chamber of housing (112) from the sliding interfit of the piston and cylinder components. Piston component (170) also includes an annular groove (198) for receiving the annular collar (160). Wear rings (191, 193) are provided between piston component (170) and cylinder component (150).

21 Claims, 7 Drawing Sheets

HALF PROFILE GATE VALVE

BACKGROUND OF THE INVENTION

1. Field of the Invention

The present invention pertains to gate valves used in the manufacture of silicon wafer chips.

2. Related Art

In the manufacture of silicon wafer chips, wafer processing is done within process modules that perform the various processing tasks within a vacuum environment to create circuitry. The process modules are located within clean rooms in order to prevent the accumulation of any amount of foreign material on the chips during manufacture. It is well known the extent to which foreign particles can completely damage a chip.

It is also well known that operation of clean rooms is extremely expensive. In order to maximize efficiency of clean rooms, it is necessary to maximize the quantity of processing equipment within each clean room. To this end, equipment manufacturers are striving to reduce the size of their products. The smaller the size or peripheral equipment, such as related handling equipment, valves, pumps, etc., the more such equipment can fit into a given size clean room.

The present invention is directed to reducing the size of gate valves while at the same time maintaining the power, efficiency, and cleanliness of such valves.

SUMMARY OF THE INVENTION

Briefly described, the present invention comprises a gate valve for creating a vacuum tight seal to a vacuum chamber and which includes a valve housing that defines a valve chamber, which has an opening therein for providing access to the vacuum chamber. A valve plate is movable within the valve chamber from a first, open position away from the opening to a second, closed position wherein the valve plate closes the opening to the vacuum chamber. An actuator includes a movable piston component that is connected at one end to the valve plate and a cylinder component connected to the valve housing. A guide surface within the cylinder component guides linear movement of the piston component. A bellows shield extends between the piston component and the valve housing for isolating the guide surface from the valve chamber. The guide surface extends down and around the bellows, which repositions the guide surface along the bellows and allows for a significant reduction in height and width of the actuator.

According to an aspect of the invention, the piston component includes a downwardly extending annular collar and the cylinder component includes an upwardly extending annular collar that is sized to receive the annular collar of the piston component. The annular collars of the piston and cylinder components are adapted to interfit in a sliding manner permitting linear movement of the piston component within the cylinder component. The sliding interfit between the annular collars being positioned below at least a portion of the bellows.

Preferably, the piston component includes an annular groove for receiving the annular collar of the cylinder component and thereby permit a further reduction in actuator height.

According to another aspect of the invention, the piston component includes a wear ring adapted to slidingly engage the side walls of the cylinder component for providing a second guide surface between the piston component and the cylinder component.

The bellows shield is secured to the piston component at a first point along the length of the piston component and extends from the first point, in the direction of travel of the piston component, to the valve housing, and the guide surface extends at least partially along the length of the bellows shield. Preferably, the guide surface extends along substantially the entire length of the bellows shield.

According to another aspect of the invention, the valve housing has a predetermined depth and the cylinder component has a depth equal to or less than the depth of the valve housing. This is an important aspect of the present invention, because it allows for the closely adjacent positioning of other equipment, which has the advantage of reducing space requirements for the system.

The present invention also comprises a gate valve for creating a vacuum tight seal to a vacuum chamber, wherein the gate valve includes a valve housing defining a valve chamber, a valve plate movable within the valve chamber from a first, open position away from the first opening to a second, closed position closing off the opening to the vacuum chamber, and an actuator including a movable piston component that is connected at one end to the valve plate and a cylinder component connected to the valve housing. The piston component and the cylinder component define first and second working chambers for moving the piston component a travel distance. The valve housing has a second opening therein for coupling the piston component to the valve gate. The cylinder component includes an end wall with an opening therein that mates with the second opening in the valve housing. The cylinder end wall provides a guide surface for guiding linear movement of the piston component. The piston component includes a downwardly extending annular collar and the cylinder end wall including an upwardly extending annular collar that is sized to receive the annular collar of the piston component. The annular collars of the piston and cylinder components are adapted to interfit in a sliding manner permitting linear movement of the piston component within the cylinder end wall.

The present invention also comprises a gate valve for creating a vacuum tight seal to a vacuum chamber, including a valve housing defining a valve chamber, a valve plate movable within the valve chamber from a first, open position away from the opening to a second, closed position wherein the valve plate closes the opening to the vacuum chamber, and an actuator including a movable piston component that is connected at one end to the valve plate and a cylinder component connected to the valve housing. A guide surface of the cylinder component guides linear movement of the piston component. The valve housing has a predetermined depth and the actuator having a depth equal to or less than the depth of the valve housing. A narrow profile gate valve achieves significant size reduction, which allows for additional space to be used by other equipment.

DESCRIPTION OF THE DRAWINGS

The accompanying drawings, which are incorporated in and form a part of this specification, illustrate embodiments of the invention and, together with the description serve to explain the principles of the invention, wherein.

DETAILED DESCRIPTION OF THE PREFERRED EMBODIMENT

Reference will now be made in detail to the preferred embodiments of the invention, examples of which are illustrated in the accompanying drawings. While the invention will be described in conjunction with the preferred embodiments, it will be understood that they are not intended to limit the invention to those embodiments. On the contrary, the invention is intended to cover alternatives, modifications and equivalents, which may be included within the spirit and scope of the invention as defined by the appended claims.

Figure 1:
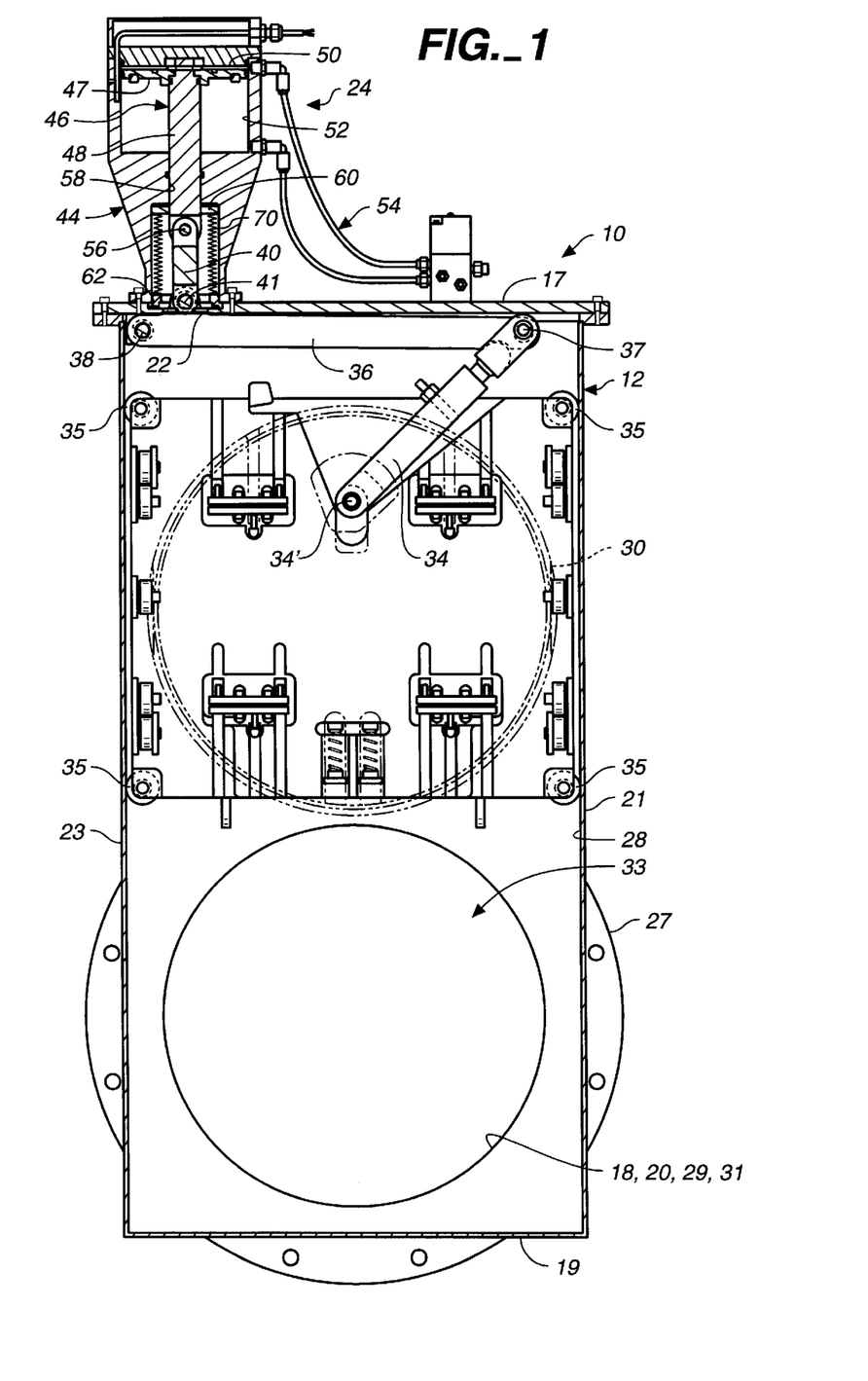
FIG. 1 is a vertical longitudinal section view of a prior art gate valve.
Figure 2:
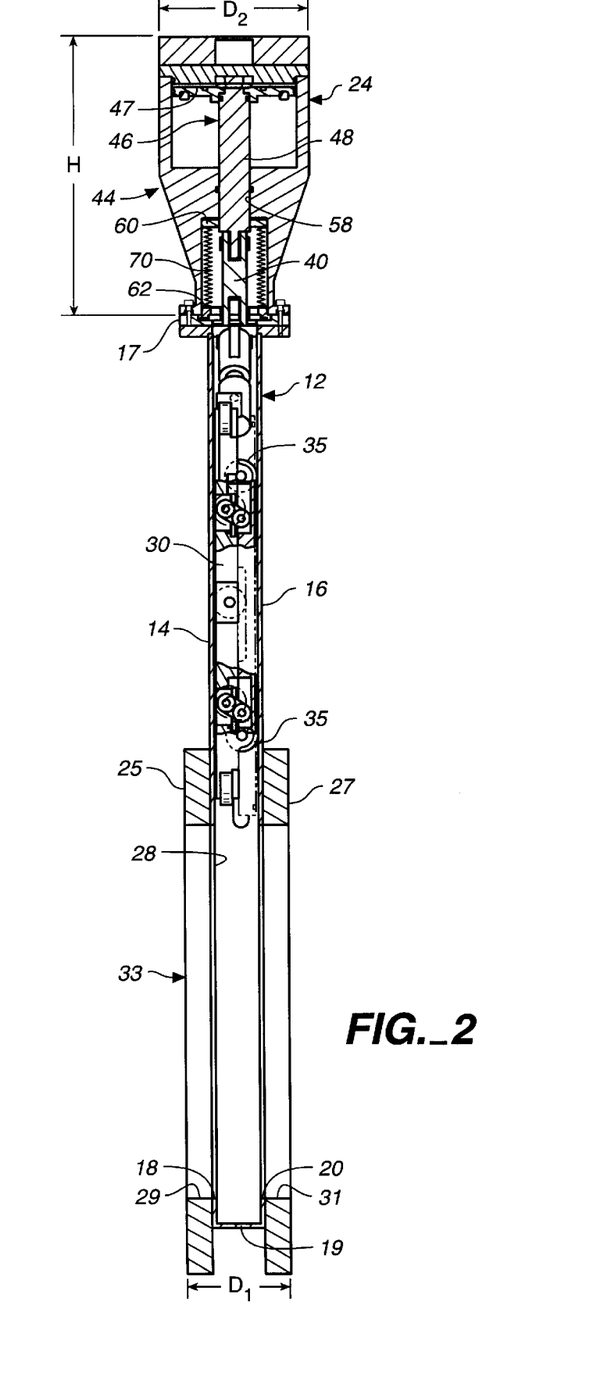
FIG. 2 is a vertical cross section view of the prior art gate valve of FIG. 1.
Figure 3:
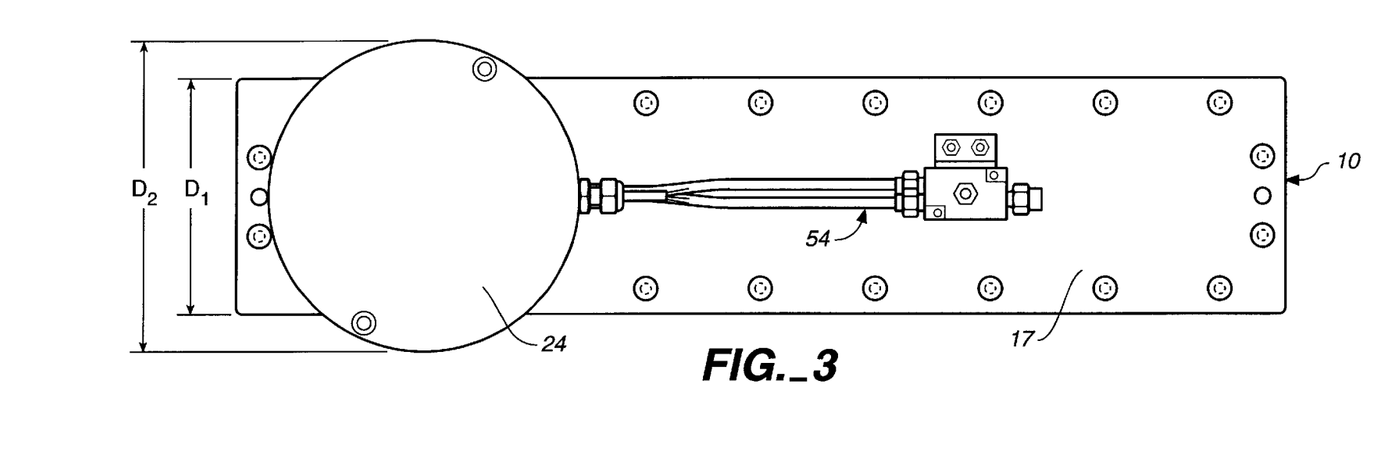
FIG. 3 is a top plan view of the gate valve of FIG. 1.

FIGS. 1–3 illustrate the design of a prior art gate valve, indicated generally by reference numeral 10, which is currently manufactured and sold by applicant herein, as 11000 Series model, High Vacuum Apparatus, Hayward, Calif., U.S.A. Gate valve 10 includes an elongated box-like valve housing 12, which includes front and back side walls 14, 16, a top flange 17, a bottom wall 19, and end walls 21, 23. A pair of circular annular flanges 25, 27 are secured to and frame the lower portions of housing 12.

A pair of aligned first openings 18, 20 are provided in side walls 14, 16, which align with openings 29, 31 in annular flanges 25, 27. Openings 18, 20, 29, 31 will collectively be referred to as a first opening 33, which opening extends through valve housing 12 and provides access from one side of housing 12 to the other side, for example, to a vacuum chamber adjacent gate valve 10. A second opening 22 is provided in top flange 17, which opening provides access to an actuator assembly 24, discussed later. Side walls 14, 16, top flange 17, end walls 21, 23, and bottom wall 19 collectively form a valve chamber 28.

A circular valve plate 30 is vertically movable within valve chamber 28 from a first position away from openings 18, 20, as shown in FIG. 1, to a second, closed position closing off first opening 33. Rollers 35 guide valve plate 30 by engaging the interior surface of side wall 16 as the valve plate is lowered and raised. A separate actuator system is provided to seal valve plate 16 against the interior surface of side wall 14 to close off and seal first opening 33.

A linkage arrangement connects valve plate 30 to actuator assembly 24 and is comprised of a first link segment 34 pivotally connected to valve plate 30 at 34', a second link arm 36 pivotally connected at 37 to first link segment 34 and pivotally connected at 38 to valve housing 12, and a third link segment 40 partially within actuator assembly 24 and pivotally connected at 41 to second link arm 36.

Actuator assembly 24 includes a cylinder component 44 and a piston component 46, which includes a piston 47 and a piston rod 48. Cylinder component 44 and piston component 46 define first and second working chambers 50, 52, in fluid communication with pneumatic controls, indicated generally at 54. Third link segment 40 is pivotally connected at 56 to the lower end of piston rod 48. Cylinder component 44 includes an opening for receiving piston rod 48, which opening forms a round guide surface 58, which guides and limits piston rod 48 to linear movement.

An first annular collar 60 is mounted at the distal end of piston rod 48 and a second annular collar 62 is mounted to top flange 17 about second opening 22. A bellows shield 70 is mounted at its ends to collars 60, 62. Bellows shield 70 functions to isolate valve chamber 28 from the sliding interengagement of cylinder 44 and piston rod 48 at guide surface 58. In this manner, particulate debris caused by wear between the cylinder structure and the piston rod is prevented from getting into valve chamber 28 where it could then migrate to the vacuum chamber and damage equipment fabricated therein.

As shown in FIGS. 2, valve housing 12 has a depth D1 defined by the depth of circular flanges 25, 27, which depth corresponds with the depth of top flange 17. Actuator assembly 24 has a depth or diameter D2, which is greater than valve housing depth D1. The greater depth of actuator assembly 24 causes the actuator to occupy valuable additional space within the clean rooms in which such equipment operates. Adjacent wafer handling equipment must accommodate the increased dimensions of actuator 24, which further limits the space available for fabricating equipment.

In addition, the height H1 of actuator assembly 24 causes gate valve 10 to occupy space that can be utilized for other system components and tooling. The actuator assembly height is necessitated by the provision of guide surface 58 above bellows shield 70. Guide surface 58, of course, is necessary to limit piston rod 48 to linear reciprocating movement. Bellows shield 70 is desirable to prevent particulate contamination of valve chamber 28. The present invention improves upon the gate valve shown in FIGS. 1–3 by reducing both the depth and height of the gate valve so that the gate valve is much shorter and is at least as narrow as the valve housing.

Figure 4:
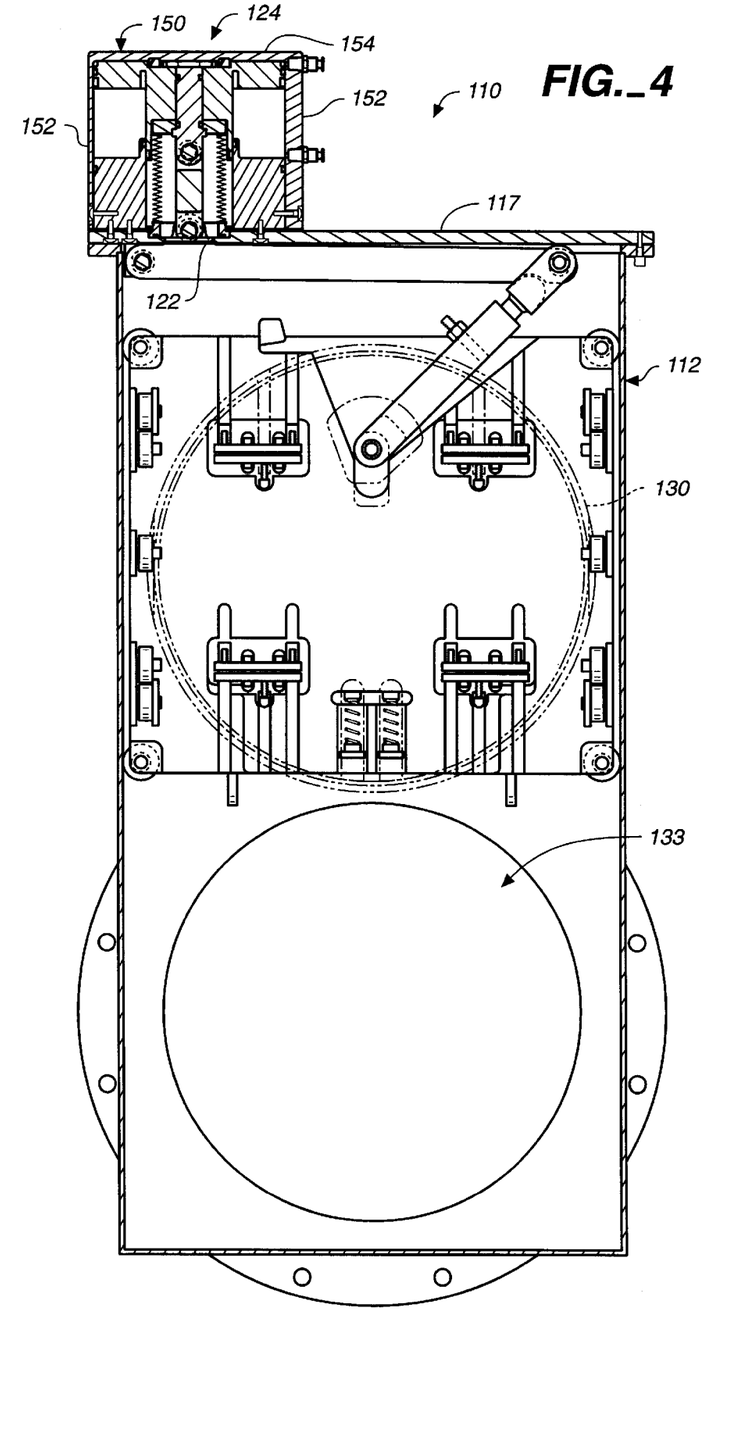
FIG. 4 is a vertical longitudinal section view of the gate valve of the present invention.
Figure 5:
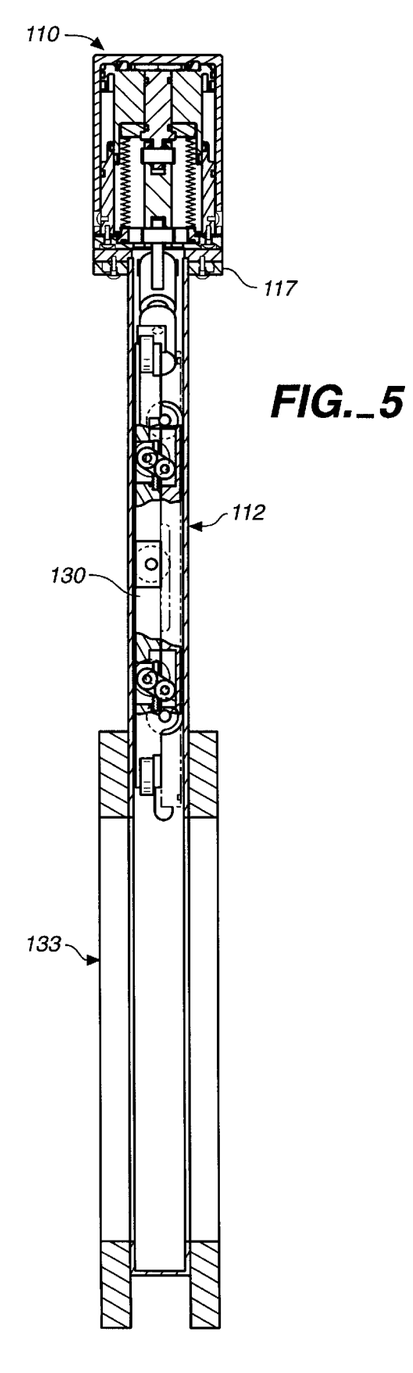
FIG. 5 is a vertical cross section view of the gate valve of FIG. 4.
Figure 6:
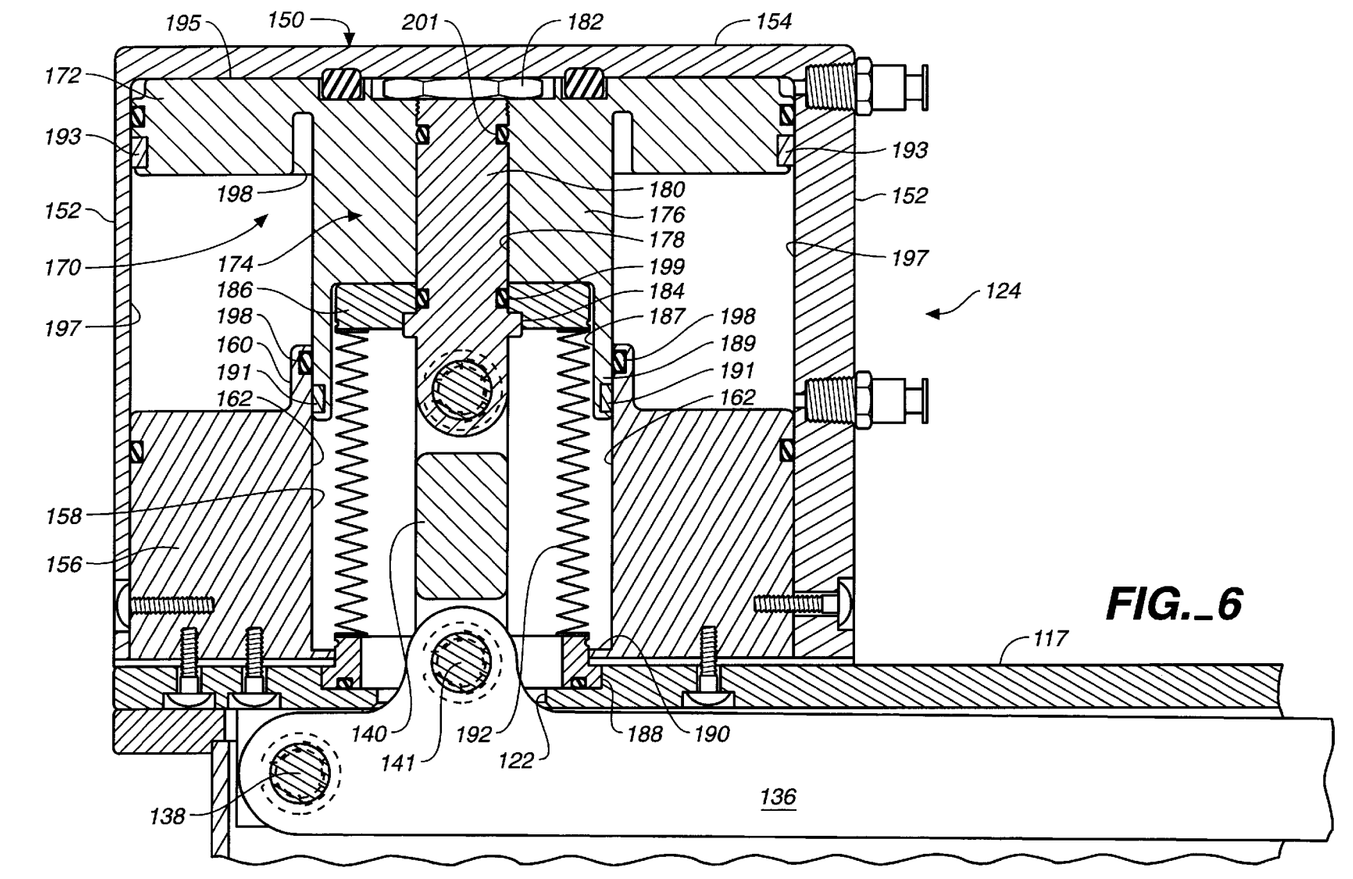
FIG. 6 is an enlarged sectional view, taken along the line 6—6 of FIG. 4, of the actuator assembly of the present invention.
Figure 7:
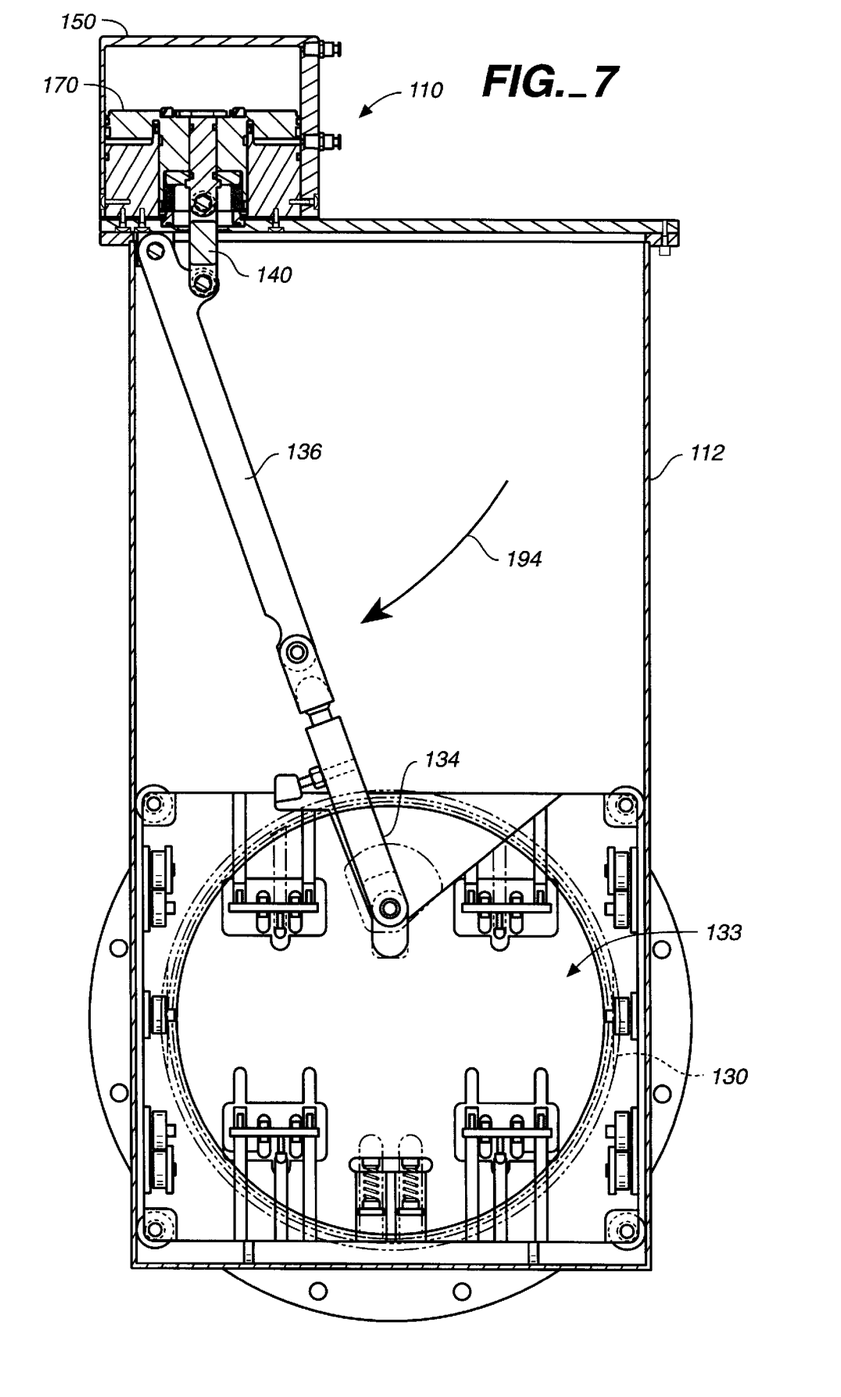
FIG. 7 is a view like FIG. 4, with the valve plate in a lowered, closed position.
Figure 8:
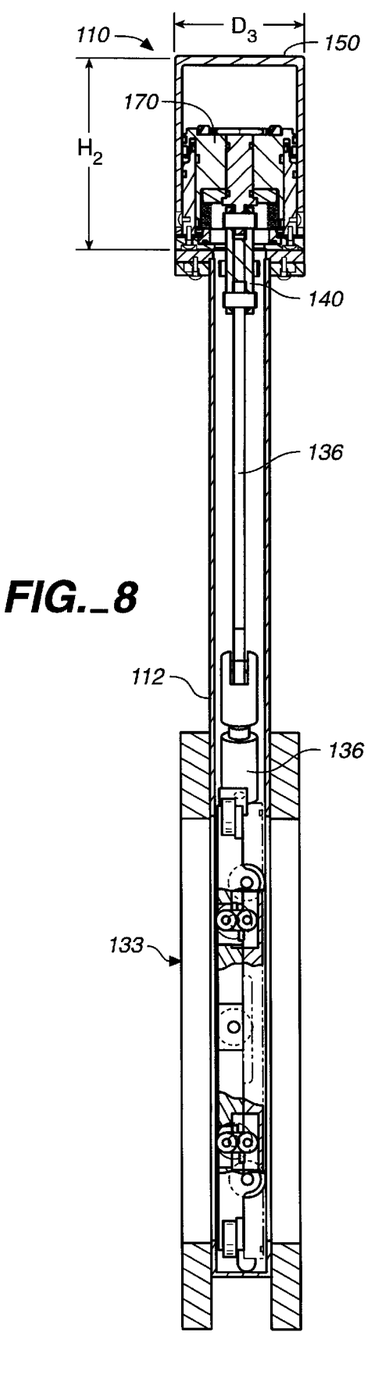
FIG. 8 is a view like FIG. 5, with the valve plate in a lowered, closed position.

FIGS. 4–8 illustrate the design of the gate valve 110 and actuator assembly 124 of the present invention. Referring to FIGS. 4 and 5, gate valve 110 includes a valve housing 112, valve plate 130, and linkage assembly 134, 136, 140 similar to those found in my prior art gate valve of FIGS. 1–3. The improvement of gate valve 110 resides in the design of actuator assembly 124. Thus, it can be assumed that valve housing 112 is identical to valve housing 12 except where noted. FIGS. 4 and 5 show gate valve 110 with its valve plate 130 in an open position away from opening 133 and FIGS. 7 and 8 show gate valve 110 with its valve plate 130 in a closed position closing off and preferably sealing opening 133.

Referring to FIG. 6, actuator assembly 124 is mounted on top flange 117 and over second opening 122. While actuator assembly 24 of my prior gate valve is generally round in shape, actuator assembly 124 is generally rectangular in shape, as defined by a cylinder component 150. Cylinder component 150 includes side walls 152, a top wall 154, and an enlarged, inner end wall 156. End wall 156 includes a central opening 158 for provision of third link segment 140 of the linkage assembly connecting segment 140 to valve plate 130. End wall 156 also includes an upstanding annular collar 160 that partially defines central opening 158. The inner surface 162 of end wall 156 and annular collar 160 defines a guide surface for guiding movement of the piston component.

The piston component is designated generally by reference numeral 170, and includes a piston 172 and a piston rod 174. Piston rod 174 can be formed integrally with piston 172 or can be made from separate component pieces. Preferably, piston rod 174 includes a wide body central portion 176 that is formed integrally with piston 172 and which has a central opening 178. An inner piston rod link 180 is secured in central opening 178 by means of a nut 182 threaded at the upper end of link 180. Link 180 includes an enlarged annular flange 184 adjacent third link segment 140. Flange 184 traps an annular mounting ring 186 against the central portion 176 of piston rod 174 and within a recessed area 187 formed by an annular collar 189 extending from the lower end of the piston rod central portion 176. A second annular mounting ring 188 is mounted about second opening 122 and is held against top flange 117 by means of an inwardly projecting flange 190 of the cylinder end wall 156.

A cylindrical bellows shield 192 surrounds third link segment 140 and is secured at one end to annular mount 186 and at its opposite end to annular ring 188. Bellows shield 192 isolates valve chamber 128 from the sliding interengagement of the cylinder end wall 156 and the central portion 176 of piston rod 174, as discussed hereinafter.

Piston component 170 includes an annular recessed groove 198, which is sized to receive the upstanding annular collar 160 of cylinder end wall 156, when the piston component moves downwardly to its second position corresponding with the gate valve's closed position.

Wear rings 191, 193 are provided at the sliding interfaces between the piston and cylinder components. Wear rings 191 provide replaceable wear surfaces between the central portion 176 of piston rod 174 and cylinder end wall 156, while wear ring 195 provides a wear surface between piston 172 and cylinder side walls 152. Suitable seals are also provided to isolate the first and second working chambers 195, 197 of the actuator 124.

Annular collar 187 of piston rod 176 and collar 160 of cylinder end wall 156 include a seal 198, which together with collars 160, 187 define a bellows shield isolating structure that isolates bellows shield 192 from the working pressure of second working chamber 197. The bellows isolating structure, as defined by components 160, 187, 198, extend down around the bellows shield and extend along at least a portion of the length of the bellows shield. By designing the structure that isolates the bellows shield from the working pressure of the second working chamber around the bellows shield, rather that above the bellows, the overall height of the actuator is significantly reduced. The bellows isolating structure ensures that the maximum pressure seen by the bellows shield is approximately 5 lbs. above atmosphere.

Seals 199, 201 are pressure seals that isolate the bellows shield and the valve chamber from the working pressure of the first working chamber 195.

It should be noted that the terms "up" or "above" and "down" are relative terms used herein to denote positions as they are shown in the drawings. Naturally, inverting the valve assembly would switch the relative positions of various components.

In operation, as best shown in FIGS. 7 and 8, piston component 170 moves up and down within cylinder component 150, which in turn pivots second segment 136 in the direction of arrow 194 (FIG. 7) and causes valve plate 130 to move to its second closed position, as shown in FIGS. 7 and 8. As piston component 170 moves up and down within cylinder component 150, the central portion 176 of piston rod 174, including annular collar 189, slides within and is guided by cylinder end wall 156, including its annular collar 160.

When piston component 170 approaches cylinder end wall 156, upstanding annular collar 160 moves into the annular recessed groove 198 of the piston. This allows for more travel of the piston within a shorter cylinder casing. As a result, the height of the actuator assembly is further reduced.

Figure 9:
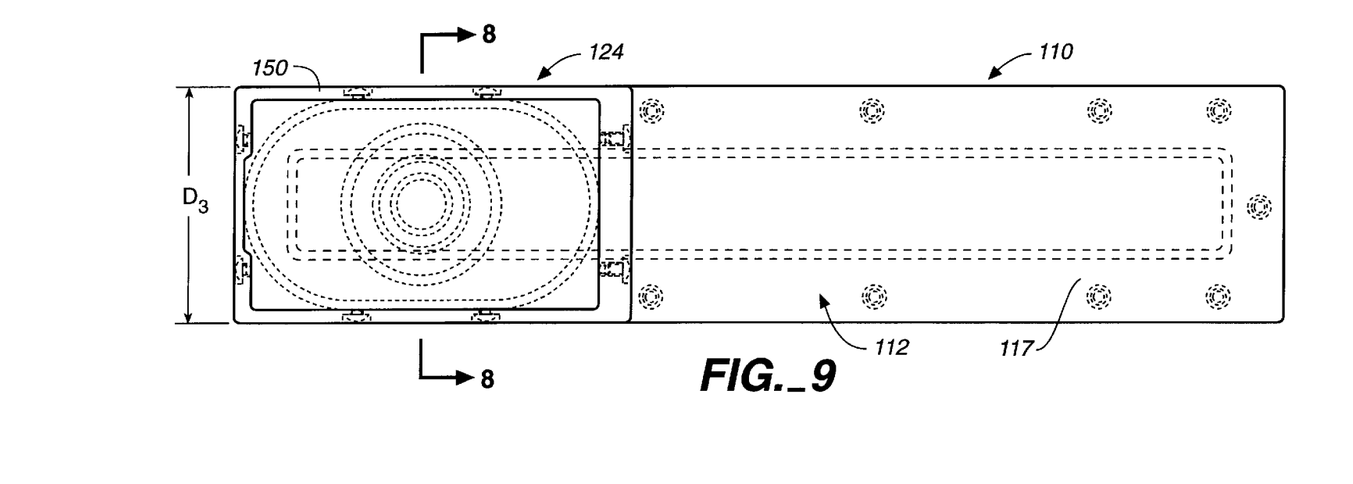
FIG. 9 is a top plan view of the gate valve of FIG. 4.

Referring to FIG. 9, it can be seen that the depth D3 of actuator assembly matches that of the upper flange 117 of valve housing 112. Thus, actuator assembly 124 takes of no more room in the depth dimension than the valve housing and, thus, does not interfere with closely positioned adjacent equipment. In addition, the height H2 of actuator assembly 124 is significantly shorter than that my prior art actuator. Actuator assembly 124 achieves a height reduction of approximately 50% over conventional prior art actuator assemblies. A reduction in height has the advantage of freeing up additional space for other fabrication equipment and related componentry, depending on the configuration of the system.

The actuator assembly of the present achieves the advantage of low height, i.e. half profile, by in one respect relocating the guide surface between the cylinder and piston components from above or longitudinally displaced from the bellows shield to a position down around the bellows or at least partially extending along the length of the bellows. By repositioning the guide surface around the bellows, the substantial cylinder structure necessary to guide the piston rod can be substantially reduced.

Height reduction is also achieved due to the interfitting design provided by the upstanding annular collar of the cylinder and the annular recessed groove of the piston. This interfitting design also helps achieve a reduction in structure necessary to guide the piston rod.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A gate valve for creating a vacuum tight seal to a vacuum chamber, comprising a valve housing defining a valve chamber, the valve chamber having an opening therein for providing access to the vacuum chamber, a valve plate movable within the valve chamber from a first, open position away from the opening to a second, closed position wherein the valve plate closes the opening to the vacuum chamber, an actuator assembly including a movable piston component that is connected at one end to the valve plate and a cylinder component connected to the valve housing, the piston component and the cylinder component defining first and second working chambers for moving the piston component a travel distance, a bellows shield extending between the piston component and the valve housing for isolating the second working chamber from the valve chamber, the piston and cylinder components defining bellows isolating structure that isolates the bellows shield from the working pressure of the second working chamber, the bellows isolating structure extending along at least a portion of the bellows shield, the bellows isolating structure and bellows shield being positioned within the actuator assembly and out of the valve chamber.

2. The gate valve of claim 1 wherein, the bellows isolating structure includes cooperating guide surfaces of the piston and cylinder components.

3. The gate valve of claim 2 wherein, the piston component includes a downwardly extending projection that extends around and along at least a portion of the length of the bellows shield, the downwardly extending projection slidingly engaging the cylinder component.

4. The gate valve of claim 3 wherein, the cylinder component includes an upwardly extending projection that slidingly engages the downwardly extending projection of the piston component.

5. The gate valve of claim 1 wherein, the bellows isolating structure includes a piston rod of the piston component and a cylinder end wall of the cylinder component.

6. The gate valve of claim 1 wherein, the cylinder component includes a guide surface for guiding linear movement of the piston component, the guide surface extending down and around the bellows.

7. The gate valve of claim 6 wherein, the guide surface forms part of an end wall of the cylinder component.

8. The gate valve of claim 7 wherein, the piston component includes a downwardly extending annular collar and the cylinder component includes an upwardly extending annular collar that is sized to receive the annular collar of the piston component, the annular collars of the piston and cylinder components adapted to interfit in a sliding manner permitting linear movement of the piston component within the cylinder component, the sliding interfit between the annular collars being positioned below at least a portion of the bellows.

9. The gate valve of claim 8 wherein, the piston component includes an annular groove for receiving the annular collar of the cylinder component and thereby permit greater travel of the piston component.

10. The gate valve of claim 6 wherein, the piston component includes a wear ring adapted to slidingly engage the side walls of the cylinder component for providing a second guide surface between the piston component and the cylinder component.

11. The gate valve of claim 6 wherein, the bellows shield is secured to the piston component at a first point along the length of the piston component and extends from the first point, in the direction of travel of the piston component, to the valve housing, and the guide surface extends at least partially along the length of the bellows shield.

12. The gate valve of claim 11 wherein, the guide surface extends along substantially the entire length of the bellows shield.

13. The gate valve of claim 1 wherein, the valve housing has a predetermined depth and the cylinder component has a depth equal to or less than the depth of the valve housing.

14. A gate valve for creating a vacuum tight seal to a vacuum chamber, comprising a valve housing defining a valve chamber, the valve housing having a first opening therein for providing access to the vacuum chamber, a valve plate movable within the valve chamber from a first, open position away from the first opening to a second, closed position closing off the opening to the vacuum chamber, an actuator assembly including a movable piston component that is connected at one end to the valve plate and a cylinder component connected to the valve housing, the piston component and the cylinder component defining first and second working chambers for moving the piston component a travel distance, the valve housing having a second opening therein for coupling the piston component to the valve gate, the cylinder component including an end wall with an opening therein that mates with the second opening in the valve housing, the cylinder end wall providing a guide surface for guiding linear movement of the piston component, a bellows shield extending between the piston component and the valve housing about the second opening thereof, for isolating the valve chamber from the guide surface, the guide surface extending at least partially along the length of the bellows shield the guide surface and the bellows shield being positioned within the actuator assembly and out of the valve chamber.

15. The gate valve of claim 14 wherein, the piston component includes a downwardly extending annular collar and the cylinder end wall includes an upwardly extending annular collar that is sized to receive the annular collar of the piston component, the annular collars of the piston and cylinder components adapted to interfit in a sliding manner permitting linear movement of the piston component within the cylinder end wall, the annular collar of the piston component extending outwardly of and along at least a portion of the bellows shield.

16. The gate valve of claim 15 wherein, the piston component includes a wear ring adapted to slidingly engage the interior surface of the cylinder side wall, the cylinder sidewall forming a second guide surface for guiding linear movement of the piston component.

17. The gate valve of claim 16 wherein, the piston component includes an annular groove for receiving the annular collar of the cylinder end wall.

18. A gate valve for creating a vacuum tight seal to a vacuum chamber, comprising a valve housing defining a valve chamber, the valve housing having a first opening therein for providing access to the vacuum chamber, a valve plate movable within the valve chamber from a first, open position away from the first opening to a second, closed position closing off the opening to the vacuum chamber, an actuator assembly including a movable piston component that is connected at one end to the valve plate and a cylinder component connected to the valve housing, the piston component and the cylinder component defining first and second working chambers for moving the piston component a travel distance, the valve housing having a second opening therein for coupling the piston component to the valve gate, the cylinder component including an end wall with an opening therein that mates with the second opening in the valve housing, the cylinder end wall providing a guide surface for guiding linear movement of the piston component, the piston component including within the actuator assembly and out of the valve chamber a downwardly extending annual collar and the cylinder end wall including within the actuator assembly and out of the valve chamber an upwardly extending annular collar that is sized to receive the annular collar of the piston component, the annular collars of the piston and cylinder components adapted to interfit in a sliding manner permitting linear movement of the piston component within the cylinder end wall.

19. The gate valve of claim 18 wherein, the piston component includes a wear ring adapted to slidingly engage the interior surface of the cylinder side wall, the cylinder sidewall forming a second guide surface for guiding linear movement of the piston component.

20. The gate valve of claim 18 wherein, the piston component includes an annular groove for receiving the annular collar of the cylinder end wall and thereby permit greater travel of the piston component.

21. A gate valve for creating a vacuum tight seal to a vacuum chamber, comprising a valve housing defining a valve chamber, the valve chamber having an opening therein for providing access to the vacuum chamber, a valve plate movable within the valve chamber from a first, open position away from the opening to a second, closed position wherein the valve plate closes the opening to the vacuum chamber, an actuator including a movable piston component that is connected at one end to the valve plate and a cylinder component connected to the valve housing, the piston component and the cylinder component defining first and second working chambers for moving the piston component a travel distance, a guide surface within the cylinder component and out of the valve chamber for guiding linear movement of the piston component, the valve housing having a predetermined depth and the actuator having a depth equal to or less than the depth of the valve housing.

* * * * *